INVENTOR.
Philip E. Berghausen
BY
ATTORNEYS

United States Patent Office 3,443,153
Patented May 6, 1969

3,443,153
E.D.M. POWER SUPPLY WITH CURRENT ADJUSTING CIRCUITRY RESPONSIVE TO GAP CONDITION
Philip E. Berghausen, Cincinnati, Ohio, assignor to The Cincinnati Milling Machine Co., Cincinnati, Ohio, a corporation of Ohio
Filed Oct. 23, 1967, Ser. No. 677,124
Int. Cl. H05b 37/02
U.S. Cl. 315—224                      10 Claims

ABSTRACT OF THE DISCLOSURE

An electrical discharge machining power supply circuit having means for detecting undesirable machining results upon a workpiece is provided with a supervisory control that automatically adjusts the amount of current output to the machining gap in accordance with the area of the work over which machining is occurring. The supervisory control receives an output signal from the detecting means and the output from the supervisory control varies in accordance therewith to adjust the main power output circuit to increase or decrease the current output capacity to the machining gap.

Background of the invention

In an electrical machining process when the area over which machining occurs increases or decreases during a cut, it has long been recognized that the machine operator must make adjustments in the power supply. This is best illustrated in the situation where a pointed tool is moved into the workpiece. Initially, only a very small area of machining is present at the point of the tool but as the tool penetrates progressively further into the workpiece, the area over which machining occurs expands guite rapidly. In such a process the power supplied for cutting must be at a low initial level to prevent the tool from being damaged, but as the useful area of the tool increases, more power can be transmitted safely through it.

It is the usual practice for the operator of the machine to observe the machine and listen to the process and then make adjustments as the actuating area changes. He usually will vary the power either by adjusting the voltage across the gap or by changing the length of machining pulses so as to vary the on-time to off-time ratio of the pulsed power supply. In the processes wherein very low tool wear is obtained, the wear is related directly to the on-time to off-time ratio of the machining pulses and by varying these parameters the operator can cause the tool to wear more than is desirable. Further, the operator cannot readily see the process because the machining is carried out in a dielectric fluid such as, for example, transformer oil, and therefore his ability to observe the process and detect the need for change is insufficient to enable even the most skilled operator to make appropriate adjustments in all cases to eliminate serious tool damage or to prevent undesirable wear.

Therefore, it is an object of this invention to provide a supervisory control circuit to automatically monitor the machining process and to make appropriate adjustments in the power supplied to the machining gap in accordance with the area over which machining is occurring.

Summary of invention

The present invention operates on the theory that for a given current output from the power supply and when insufficient area for machining is available, an excess of bad or ineffective machining pulses will occur. This excess of bad pulses is detected as an excessive number of short circuited pulses through the gap. In the preferred form of this invention, the short circuits are detected by a pulse quality test circuit that is connected directly to the machining gap. The incidence of short circuited or bad pulses is indicated by this test circuit and this information is applied as an input signal to a supervisory control circuit in this embodiment of the invention. The supervisory control circuit includes switching means which operates selectively to increase or decrease the power output capacity of the main pulsed power supply. For any instantaneous power output setting, if the input information to the supervisory control shows that the incidence of shorted pulses crosses in one direction to a valve above a preset level, the control will operate to reduce the power supply current output capacity. The use of the most efficient power settings will still produce a certain percentage of shorted pulses in normal operation so that when an extremely low incidence of bad pulses is indicated, increased current is necessary. Therefore, if an unusually low number of short circuits is occurring, the detected incidence of shorted pulses crosses in the other direction to a value below a second preset level and the control will operate to add additional current capacity to the power supply. Reference to the drawings and the detailed description hereinafter will provide a clear understanding of the apparatus and functioning of this invention.

The drawings

Description

Figure 1:
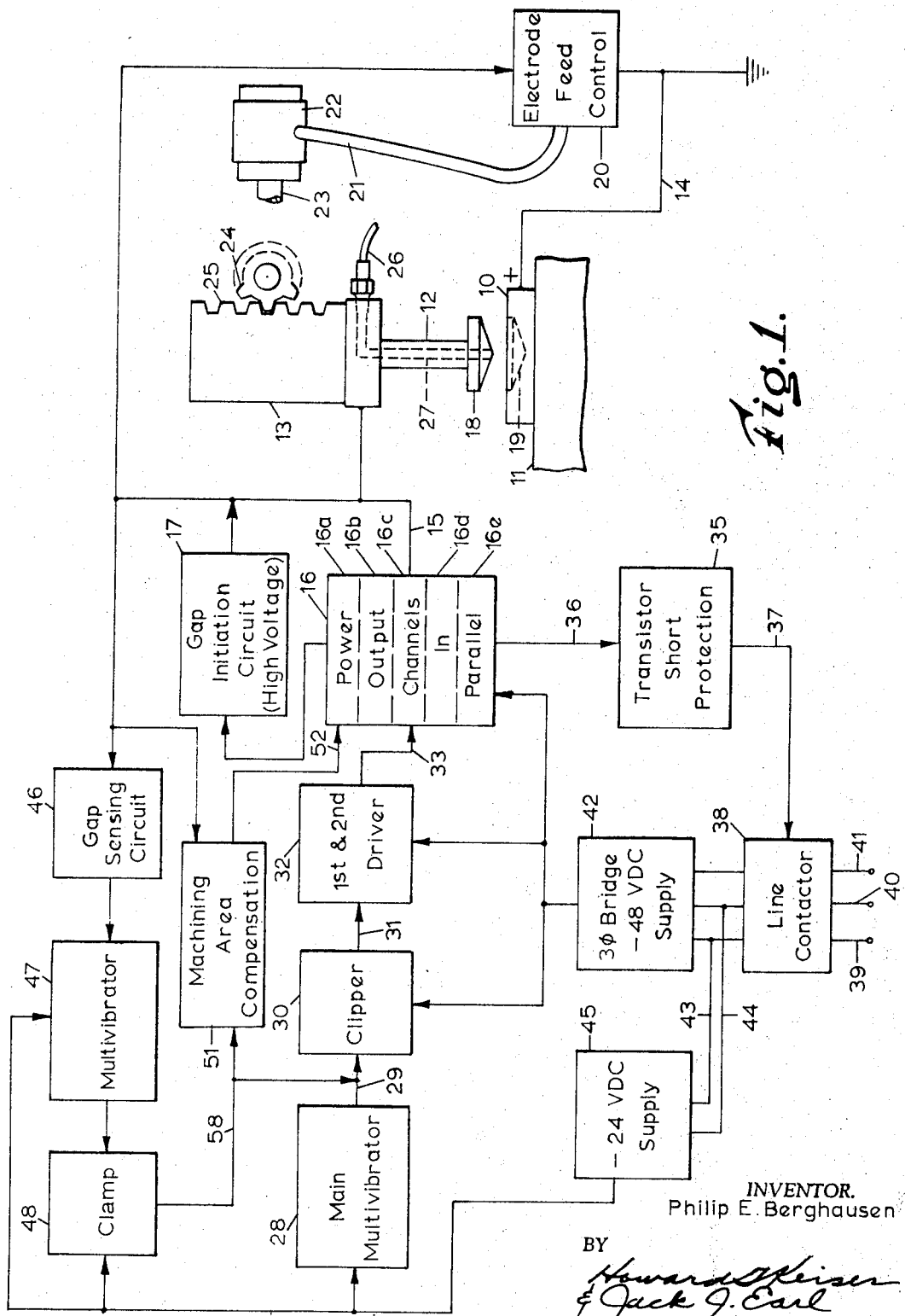
FIG. 1 is a block diagram of the power supply circuit for an E.D.M. apparatus, the mechanical portions of the machine being shown in simplified form with the block diagram.

This invention is described herein in a combination with the electrical discharge machining unit illustrated by the block diagram circuit and simplified mechanism of FIG. 1. The apparatus is intended to machine a workpiece 10 which is supported on the machine base 11 and which includes a tool electrode 12 attached to a ram 13 that is electrically insulated from the base 11. The ram 13 is movable toward and away from the base 11 to move the electrode 12 to and from the workpiece 10 which also acts as an electrode in the electrical circuit. As shown, the workpiece 10 is connected to ground potential by a conductive cable 14 while the electrode tool 12 is connected by means of a conductor 15 to a power output circuit 16 and a gap initiation circuit 17 which combination outputs high energy negative polarity pulses of direct current energy at a high frequency. Thus the tool electrode 12 is cathodic with respect to the anodic work 10 and when the two are brought into close proximity, sparks result and metal is removed from the workpiece 10 in the well known manner of E.D.M. processes.

As shown in FIG. 1, the tool 12 has a machining tip 18 which has a conically shaped face adapted to produce a corresponding conically shaped cavity 19 in the workpiece 10. It can be seen that as the tip 18 is moved against the workpiece 10 and as the workpiece 10 is eroded away to produce the corresponding cavity 19, that the area of the tool in use will change. As the tool tip 18 initially approaches the work 10, only a very small area of machining will be present, but as the tool tip 18 penetrates into the workpiece 10, the area of machining will gradually and progressively increase until such time as the full area of the conical tip 18 of the tool 12 is operative to cause machining of the workpiece 10. Thus, it can be seen that a varying amount of the tool tip 18 will be employed to transmit the power for machining between the two electrodes 12 and 10.

The feed rate, that is the velocity of movement of the tool tip 18 into the workpiece 10, is under control of a conventional feed control circuit 20 that monitors the voltage across the machining gap between the tool 12 and the workpiece 10. The feed circuit 20 operates on the principles of servo mechanisms to maintain a constant average voltage across the gap and when this voltage drops toward zero potential, as when a direct short circuit occurs, the feed direction is reversed to withdraw the tool 12 away from the workpiece 10. This will cause the average potential to rise and then with the potential rise, the tool 12 is restarted back toward the work 10. The feed control circuit 20 is connected by a cable 21 to a reversible feed motor 22 that drives the ram 13 up or down through a mechanical connection 23 terminating at a pinion 24 and a rack 25 integral with the ram 13.

The process is normally carried out in a dielectric medium such as oil. Therefore, a hose 26 is shown connected to the electrode 12 to supply the dielectric fluid under pressure to a central passage 27 through the electrode 12 from which it is discharged into the machining gap between the tool tip 18 and the workpiece 10.

The frequency of the pulsating direct current for the machining operation is controlled by a free-running multivibrator circuit 28 that outputs a series of pulses over a conductor 29 leading to a clipping circuit 30. The clipping circuit 30 clips these pulses at some level below the output from the multivibrator 28 to provide a series of pulses to an output line 31, each pulse of this series having a very fast rise time as a result of the clipping action. These pulses are passed over the line 31 to the driver stages 32 where they are amplified and subsequently applied over a conductor 33 to the output stage 16. The output stage 16 contains a group of parallel current amplifiers 16a–16e supplying pulsating direct current to the line 15 at a high power level and at a frequency determined by the frequency of the free-running multivibrator 28. If more or fewer of parallel current amplifiers 16a–16e are made effective in the output circuit stage 16, more or less current is available for supply to the machining gap. Therefore, the parallel output stages 16a–16e are made switchable into circuit selectively by operation of relays included in the output stage and by operating these relays, as described subsequently herein, the current output capacity for the power output stage 16 can be changed.

The performance of the output stage 16 is monitored by a short protection circuit 35 to which a voltage level output signal is connected by a conductor 36. When this voltage output does not return to a preset low magnitude within a predetermined time, a signal is applied over a line 37 to a line current contactor unit 38 which serves as an overload circuit breaker that disconnects the three-phase power input lines 39, 40, 41 from the direct current voltage supply unit 42. It also disconnects the single phase connection via lines 43, 44 from a second direct current power supply 45. When the line contactor unit is operated to open the lines 39, 41, the entire power supply circuitry is deenergized and cannot be reenergized except manually.

The servo feed system described tends to operate in a manner to provide protection against short circuiting of the tool electrode 12 and the work 10 since it operates in an inverse relationship with the gap voltage. When a tool-work short occurs, the voltage therebetween drops to a very low level and therefore the servo system will begin to withdraw the tool electrode 12 away from the work 10. The servo feed system will be too slow normally to react in the case of a short circuit to pull the tool 12 back from the work 10 in time to protect against catastrophic damage to elements in the process.

In view of the protective shortcomings of the apparatus described thus far, additional safety circuitry is required in the system which is much faster in operation than the line contactor 38 or the feed control circuitry 20 and the mechanism 22–25. This additional circuitry is provided by three sections of circuitry including a gap sensing circuit 46, a multivibrator 47 and a clamping circuit 48, the details of these being shown in FIG. 2. It is the function of these circuits to test the quality of machining discharges at the gap and to turn-off the pulsed electrical power to the gap temporarily if the quality is not up to the desired standard. Since many bad pulses are the result of temporary short circuit conditions, the protective circuit herein permits a preset number of bad discharges in succession before acting to turn-off the power temporarily. For example, the circuit may be aligned to require three bad discharges in succession before the power to the gap is interrupted. The time for these three discharges to occur would be less than the normal time for the servo feed to react and reverse the feed so that the protective circuit herein affords protection over and above that inherent in the servo feed arrangement.

Figure 2:
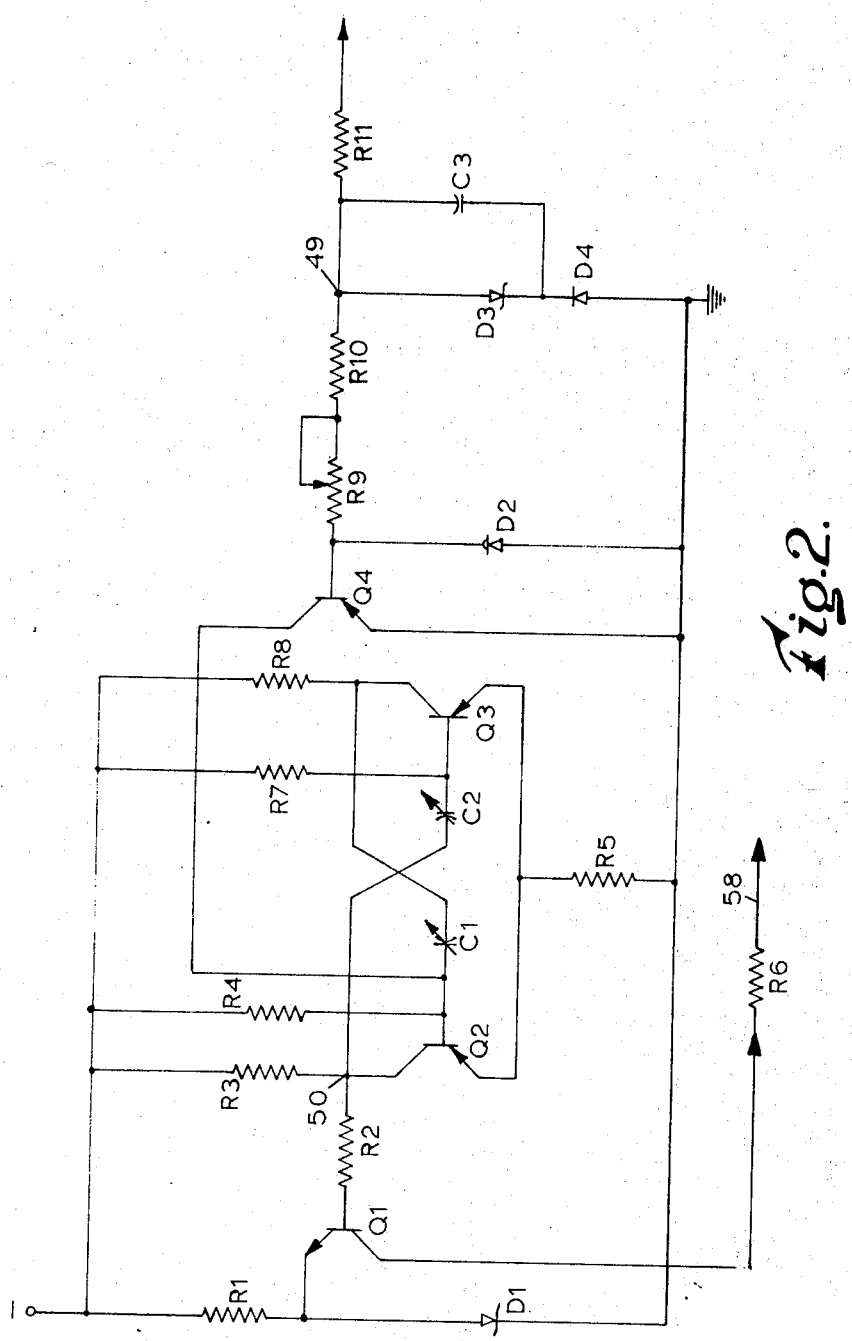
FIG. 2 is a detailed schematic diagram of the machining pulse quality testing circuit.

The sensing circuit 46, shown in detail in FIG. 2, tests the machining quality of spark discharges across the gap. It includes a transistor Q4 which is forward biased to conduct whenever the gap voltage reaches a preset level which is indicative of ionization of the dielectric and a good discharge. A short at the gap will prevent the voltage from reaching this level and therefore the transistor Q4 will not switch on to conduct. The feed back of each discharge voltage signal is applied from the line 15 to a dropping resistance R11 that limits the voltage input at the junction 49 to a specified value which will not cause damage to the transistor Q4 and its control circuit elements. A Zener diode D3 acts in a limiting manner, also controlling the voltage at point 49 to a fixed maximum value. The Zener diode D3 has high frequency limitations and therefore a shunt path through a capacitor C3 and an asymmetric diode D4 are included to pass to ground the transient frequencies above the range of operation of the diode D3. The limited signal at point 49 is further attenuated by the resistances R9 and R10 and the resulting signal is applied to a tunnel diode D2 and to the base of the transistor Q4. The resistance R9 is a potentiometer which permits limited adjustment of the signal level connected to the elements D2 and Q4 to a selected value to provide an adjustment of a fine nature for the level dividing good and bad discharges. The tunnel diode D2 acts in a snap action manner due to its negative voltage characteristic when a good pulse is detected to immediately drive the transistor Q4 full on. Upon each electrical pulse resulting in a good discharge, the transistor Q4 is turned on briefly by the bias signal applied to its base through the circuit described. A bad discharge is identified by a low voltage level and does not result in a signal sufficient to cause the transistor Q4 to conduct.

Whenever the transistor Q4 is caused to conduct, it produces a reset signal that is connected to the multivibrator 47 which is also shown in detail in FIG. 2. The multivibrator 47 is of a conventional nature and includes the transistors Q2 and Q3, the resistances R3, R4, R5, R7 and R8 and the capacitors C1 and C2, these latter elements being adjustable to vary the on and off time relationship of the two valve elements Q2 and Q3. The resistance R5 produces a bias on the transistors Q2 and Q3 so that whenever the transistor Q4 is turned on, the transistor Q3 is turned on to conduct defining the reset state of the multivibrator circuit 47.

Whenever the transistor Q2 is permitted to conduct, it causes a forward bias signal at point 50 that is applied through the resistance R2 to the base of a transistor Q1 of the clamp circuit 48. The clamp circuit 48 also includes a resistance R1 and a Zener diode D1 in series which apply a fixed bias on the transistor Q1 to hold it cut off except when the junction 50 is caused to change to the forward bias value. This occurs only when the transistor Q2 is biased to conduct as described. The resistance R6 is in series between the transistor Q1 and the base circuit of an amplifier transistor (not shown) in the clipper circuit 30. When the transistor Q1 is turned on, it produces an output suppression signal that is used to bias the clipper circuit 30 to cut-off. Therefore, no pulses from the main multivibrator 28 are passed through to the circuit 30 and its succeeding circuits. Thus, the output from the transistor Q1 is used to turn off the power to the machining gap when serious shorting conditions are present at the machining gap.

The apparatus shown and described thus far is the same as that shown and described in copending United States patent application S.N. 599,140 which is assigned to the same assignee as is the present invention. Additional description of the functioning and effect of this circuitry is included in that application, but is omitted herein. However, it is intended that the description in the cited application be incorporated herein by this reference.

The output inhibit signal appearing as a variable frequency pulsed direct current wave form from the clamping transistor Q1 is transmitted to another circuit 51, FIG. 1, which makes use of the signal for a different purpose than that which is made of it at the clipper stage 30. The occurrence of the direct current pulses in the inhibit signal from the transistor Q1 is informative of the number and frequency of serious shorting conditions in the machining gap and therefore reflects directly the times during which the machining area between the work 10 and tool face 18 either is too small to handle the current output from the stage 16 or is sufficiently large to accept more current. This information is used in the circuit 51 which outputs commands over a signal channel 52 to effect operation of the switching devices included in the output stage 16 to add or delete the parallel current amplifier channels 16a–16e in that circuit.

Figure 3:
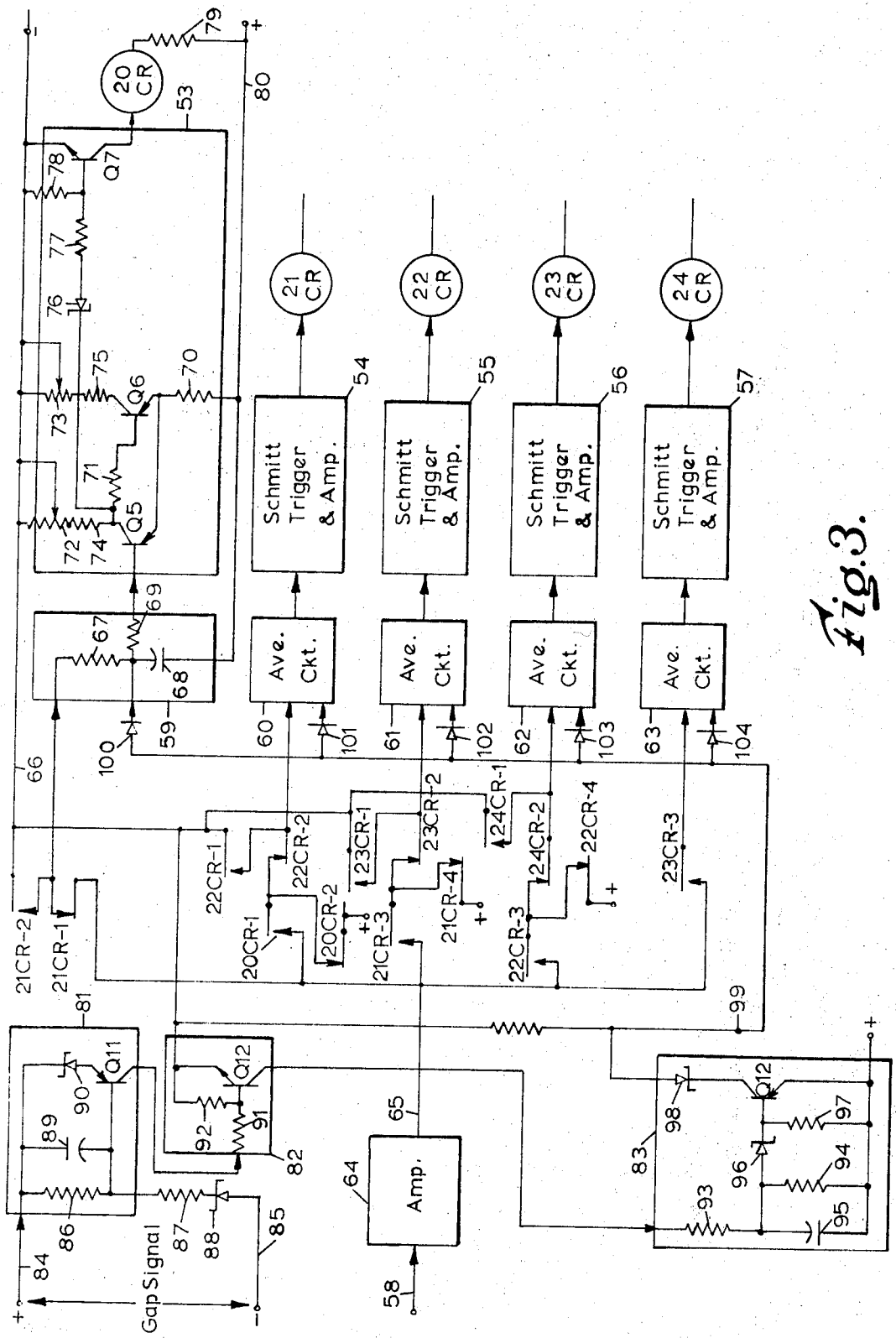
FIG. 3 is an expanded block diagram of that portion of the circuit which comprises the supervisory control circuit of this invention. A portion of the diagram of this figure is shown in detail and is illustrative of those circuits repeated within the other portions which are shown as blocks within the system.

In the specific embodiment of the supervisory circuit 51 herein and shown in detail in FIG. 3, there are five Schmitt trigger or squaring circuits 53–57, each of which also includes an amplifier output transistor. The amplified output from each of the trigger circuits 53–57 drives a relay coil to operate the relays 20CR–24CR, respectively, such that as the output signals go above circuit common, the relays 20CR–24CR are energized. The relays 20CR–24CR have contacts (not shown) in the power output stage 16 which are closed when these relays are energized. When these contacts are closed, associated current amplifier transistors in each of the channels 16a–16e are caused to operate and add the current capacity of that circuit channel to the output of the power stage 16. Thus, when all of the relays 20CR–24CR are energized, the maximum current is output from the power stage 16 to the machining gap. The deenergization of any one of the relays 20CR–24CR will reduce this current output capacity.

The use of the Schmitt trigger circuits and amplifiers makes the operation of the relays 20CR–24CR independent of relay operate characteristics and their design and adjustment provides a dead zone due to circuit hysteresis that will eliminate hunting conditions between step-up current and step-down current conditions.

The output state of the trigger circuits 53–57 is determined directly by the frequency of inhibit signals on the output line 58 from the clamping transistor Q1. The inhibit signal is used to produce an average voltage signal varying in amplitude directly with the frequency of occurrence of the inhibit signal. For this purpose, each of the trigger circuits 53–57 is provided with a voltage averaging circuits 59—63, respectively. Each of these averaging circuits 59–63 will cause its trigger circuit to fire when the average potential therefrom makes an excursion into a region below a present level. The inhibit signal from the line 58 is applied first to a conventional direct coupled amplifier circuit 64 and the output of this circuit is transmitted over a line 65 to the circuits 59–63 when it is averaged to produce bias signals that fire the triggers 53–57. The output of the amplifier 64 is applied through a switching network comprised of contacts of the relays 20CR–24CR that is arranged to cause energization of these relays 20CR–24CR seriatim in a forward operating direction when no inhibit signals occur. The energization of the relays 20CR–24CR successively will cause the current capacity of the output stage 16 to increase step by step as each new relay is energized by adding more of the power channels 16a–16e in parallel.

Assuming for illustration, that the equipment is in operation but that there are no short circuit conditions in the gap, no appreciable voltage signal will be output from the amplifier 64 over line 65 to the switching network. Assuming also that only relay 20CR is initially energized, a minimum current capacity from the power output stage 16 is available. At any start up time when no shorting occurs, the low frequency signal on line 65 is transmitted to the averaging circuit 59 by way of normally closed contacts 21-CR-1 of relay 21CR which is deenergized. The resulting average signal therein is low and the trigger circuit 53 fires to energize the relay 20CR. Its normally open contacts 20CR-1 then are closed and connect the signal from line 65 to the second averaging circuit 60 by way of the normally closed contacts 22CR-1 of relay 22CR. (The signal frequency on the line 65 follows directly as the inhibit signal on line 58 is occurring.)

Assuming that the signal frequency on the line 65 stays low, the second averaging circuit 60 will output a low amplitude signal and will operate its trigger circuit 54 to energize the second relay 21CR to thereby increase the current output capacity of the circuit 16. At this same time, the contacts 21CR-2 will be closed and the negative potential of the supply line 66 will be applied to the averaging circuit 59 to insure that the trigger circuit 53 is maintained fired to latch the relay 20CR in its energized condition. The contacts 21CR-1 will be opened to remove the effectiveness of the potential on the line 65 relative to the circuit 59. Simultaneously, the contacts 21CR-3 will close to apply the low level signal to the next averaging circuit 61. Thus any signal on the line 65 will affect only the operation of either the presently energized relay 21CR through its averaging and trigger circuits 60, 54 or the next sequential circuits 55 and 61 and relay 22CR.

As can be seen from FIG. 3, similar energization of the relays 22CR, 23CR and 24CR will occur step by step as long as the average voltage on line 65 remains at the low level. The current output from the circuit 16 will be progressively stepped until the maximum output level is reached. Each of the relays 20CR–23CR will be latched in the energized state by operation of contacts of the next highest current capacity relay and cannot be deenergized until the respective latch condition is removed.

The relays 20CR–24CR will be deenergized in the reverse sequential order when the average of the signal on the line 65 makes an excursion into a region above a predetermined level. The trigger circuit 57 will be caused to switch off when the average signal amplitude on the line 65 reaches the preset level. The contacts 24CR-1 which provide the latch circuit for the relay 23CR control circuits 62 and 63 will then open to remove the latch condition. At the same time the contacts 24CR-2 will be placed in their normally closed condition and the signal on line 65 will be applied to the averaging circuit 62. The contacts 22CR-3 will be closed at this time since relay 22CR was latched in the energized state upon the energization of relay 23CR through the action of the contacts 23CR-1 and 23CR-2.

If the signal on line 65 continues at the same high amplitude after relay 24CR will be deenergized and the current capacity of the ouput stage correspondingly will be reduced, the trigger circuit 56 will switch off and the relay 23CR will deenergize to further reduce the current output. Its contacts 23CR-1 and 23CR-2 will operate to remove the latch circuit for relay 22CR and render that relay sensitive to the signal on line 65. As can be seen, if the high level signal on line 65 persists, each of the relays 24CR through 21CR will be deenergized in the reverse progressional order, and eventually only the relay 20CR will be energized to maintain the minimum current output capacity. However, if at any time the average level of the signal on line 65 is lowered to that level at which the relays 21CR-24CR operate in the forward progression, the reverse progression will stop and the forward progression will occur to increase the current output capacity of the circuit 16.

It should be pointed out that under the normal and most efficient machining conditions a certain percentage of the direct current pulses to the gap will be shorted; for example, the normal range for a particular power supply voltage and work material may result in 10% shorted pulses. This will result in a predetermined average voltage from the amplifier 64 and this average voltage will be the critical level to define the condition at which a forward switching progression is caused to begin and there will be a range of average signal levels over which this switching will occur. The trigger circuits 53–57 are designed to have a hysteresis condition between that average bias level at which they will not fire and the bias level at which they are turned off after they have fired. The critical bias amplitude for switching off is somewhat higher than that above which switching on will not occur. This prevents hunting and insures the most efficient use of the equipment.

The detail of the averaging circuit 59 is shown in FIG. 3. It is comprised of a resistance 67 and a capacitor 68 which act to average the variable signal on the line 65 when they are connected to that conductor. The average voltage is transmitted through a base current limiting resistance 69 and is applied to the trigger circuit 53 as a bias signal. Each of the circuits 60–63 is identical to the circuit 59 and therefore the circuits are not repeated in detail in the drawings but are shown only representatively as blocks.

The trigger circuit 53 is also shown in detail and is identical to the circuits 54–57 which also are shown only as blocks. The Schmitt trigger is comprised of the transistors Q5 and Q6 which are conventionally connected with a common emitter resistance 70 and cross coupled through a resistance 71. The load resistance networks or each transistor Q5 and Q6 includes a potentiometer 72, 73, respectively, in series with a fixed resistance 74, 75. The adjustment of the potentiometers 72, 73 determines the level of bias from the circuit 59 which will cause the circuit to fire and that level at which it will cease to be fired. These are preset for the desired level in each of the circuits 53–57.

The circuit 53 (and the similar circuits 54–57) also includes an amplifier transistor Q7 which provides the drive required to operate the relay 20CR from the signal output from the Schmitt trigger portion of the circuit. The trigger signal is developed across resistances 77 and 78 and a Zener diode 76 and when the trigger is fired, this signal produces a forward bias on the transistor Q7. The Zener diode 76 insures that the amplifier Q7 is not caused to conduct when the normally on transistor Q6 conducts during the time when the trigger is not fired. The current through the transistor Q7 is passed through the energizing coil of the relay 20CR and a limiting resistance 79 in the serial path between the negative and positive supply lines 66 and 80.

The circuit of FIG. 3 includes three additional functional units, a voltage sensing circuit 81, a transfer circuit 82 and a gap voltage averaging and clamp circuit 83. It is the purpose of these circuits in combination to provide a protective circuit that prevents the relays 20CR–24CR from being sequentially operated as described in the forward direction to increase the current capacity as the tool approaches the work from a completely open circuit condition such as when a machining operation is to be begun with the initial movement of the tool to the work. There would be no inhibit output on line 58 since there would be no short circuits and there would be no signal on the line 65. Under these conditions, the relays 20CR–24CR would sequentially operate to provide full current capacity which would be unsatisfactory at the first instance of machining.

The voltage sensing circuit 81 includes a transistor Q11 that is connected to be operated in response to the voltage signal across the machining gap. The line 84 connects with common line 14, FIG. 1, and the line 85 connects with the power supply line 15 so that the gap voltage is developed across a voltage divider comprised of the resistances 86 and 87 and a Zener diode 88. The Zener diode 88 is chosen to have a conduction voltage level sufficiently high that it will conduct only when open circuit voltage level is approached in the gap. For example, a level of fifty-one volts or more may indicate the approach to an open circuit level with a specific power supply. Therefore, the Zener diode 88 would be one having a fifty-one volt conduction characteristic. When the Zener diode 88 conducts, a capacitor 89 begins to charge but at a rate dependent upon the time constant of the system determined by the values of the resistance 87 and capacitor 89. When the capacitor 89 is charged to a value equal to the drop across a Zener diode 90 in the emitter circuit of the transistor Q11, the transistor Q11 is switched on to conduct. Thus the voltage across the gap must reach a level equal to the sum of the drop across the Zener diodes 33 and 90, and this indicates an open circuit. The time delay provided by the capacitor 89 renders this circuit 81 sensitive only to open circuit conditions since in a normal machining pulse, the gap voltage reaches a peak amplitude above the critical amplitude for the Zener diode 88 to conduct, but when ionization takes place, it falls quickly back below that value. Thus, the capacitor delays the switching on of the transistor Q11 a sufficient length of time that a range of normal pulses will not turn it on. The capacitor 89 is discharged between machining pulses through the resistance 86 to condition it for each succeeding gap pulse.

When the transistor Q11 is conducting, a voltage is developed across a divider network including the resistances 91, 92 in the transfer circuit 32. This transfer circuit employs a switching transistor Q12 which is forward biased by the signal developed in the divider network when the sensing circuit transistor Q11 is conducting. When the transistor Q12 is forward biased, it conducts and applies the voltage level of the supply line 66 as an input to the averaging and clamping circuit 83.

The circuit 83 includes a resistance-capacitance averaging circuit including resistances 93 and 94 and a capacitor 95 which charges and discharges at a rate dependent upon the values of these components to produce an average voltage across the capacitor 95 dependent upon the on and off time rates of the transistor Q12. The on time to off time ratio is a greater value when gap open circuit conditions occur and therefore the average voltage across the capacitor 95 will be greatest at that time. When this average exceeds a predetermined level established by the value of a Zener diode 96, a clamping transistor Q12 is switched on by the bias signal across a resistance 97 developed upon conduction of the Zener diode 96. Conduction through the transistor Q12 causes an override signal of a selected voltage, determined by a series Zener diode 98, to be applied to the control line 99 that connects as an input to each of the averaging circuits 59–63 through asymmetric diodes 100–104. The value of the Zener diode 98 is selected such that the signal applied to the circuits 59–63 by way of the control line 99 will be in the hysteresis or gray zone of the Schmitt circuits 53–57 to hold these in the condition at which each is at the time the signal is applied. Thus, if only relay 20CR is energized by the firing of the circuit 53, this condition will be maintained until the open circuit condition at the gap is altered by the start of a machining operation. Upon initial power supply turn-on, only the relay 20CR is energized and before the second relay 21CR is energized, the open circuit condition will be sensed and the clamp circuit output will appear on the line 99 to maintain this status to produce minimum current at initial tool entry into the work.

The clamping circuit 83 as described also will hold the relays 20CR–24CR in a fixed condition if an open circuit condition occurs during a cut as by, for example, the momentary backing-out of the tool by the servo feed control 20 (FIG. 1) due to inprocess cutting conditions. In such a case, the gap will momentarily go to an open circuit condition but the servo feed 20 will quickly reverse and restart the cut. In this case it is desirable to restart with the same current capacity as was available prior to interruption by the feed control 20. Since the level of signal on line 99 is selected to be in the hysteresis zone, the relays 20CR–24CR will not be permitted to change by the occurrence of the open circuit condition after machining has been progressing for a period of time.

From this description and appended drawings, it can be seen that the invention herein provides an automatic supervisory control system which will effectively regulate the current capacity of an E.D.M. power supply in accordance with the area over which machining is taking place by sensing the instantaneous conditions of the cutting process in the machining gap. While the invention has been described in connection with one possible form or embodiment thereof, it is to be understood that the present disclosure is illustrative rather than restrictive and that changes and modifications may be made without departing from the spirit of the invention or the scope of the claims which follows.

What is claimed is:

1. In an electrical discharge machining apparatus having a power supply operable to deliver high frequency direct current pulses to a machining gap, a control system comprising in combination:
   (a) means for sensing the quality of results at the machining gap produced by power supply operation and for producing a control signal having a variable characteristic indicative of the quality,
   (b) means for comparing the control signal characteristic against preset standard levels defined for delivery of more than optimum current to the machining gap and for delivery of less than optimum current to the machining gap, said levels separated by a region of the characteristic wherein results at the machining gap are optimized, and
   (c) control means for decreasing and increasing the output current capacity of the power supply in response to said means for comparing when said characteristic crosses the standard levels from the region therebetween to tend to maintain the current output of the power supply at a level above complete cutoff and within a range producing optimized results.

2. The apparatus of claim 1 wherein:
   (a) protective means are provided for sensing an open circuit condition at the machining gap, and
   (b) override means are provided operable in response to said protective means to prevent operation of the control means to increase and decrease power supply current capacity when there is a machining gap open circuit condition.

3. In an electrical discharge machining apparatus having an output stage furnishing high frequency direct current pulses to a machining gap from a group of parallel output channels, a control system comprising in combination:
   (a) detection means for testing electrical discharge quality in the machining gap and for producing a control signal varying in direct relationship with the frequency of occurrence of bad discharges,
   (b) switching means for connecting the output channels to the machining gap to provide a selected current capacity thereto, and
   (c) control means for operating said switching means in response to excursions of said control signal to increase current capacity when the control signal crosses into a first preset region thereof in one direction and to decrease current capacity when the control signal crosses into a second preset region thereof in the other direction.

4. The apparatus of claim 3 wherein:
   (a) said control signal is a pulsed direct current signal,
   (b) said control means includes means for averaging the amplitude thereof, and
   (c) said control means includes circuit means responsive to excursions of the average amplitude of said control signal across said predetermined levels for operating said switching means.

5. The apparatus of claim 3 wherein:
   (a) said switching means includes a plurality of stages corresponding to the parallel output channels,
   (b) said control means includes a plurality of stages each having an output controlling the condition of a corresponding one of the switching stages, and
   (c) said control means further includes a sequencing network operable to render the control means stages effective in a reversible predetermined order to operate the switching stages in the same reversible predetermined order in accordance with excursions of said control signal into said predetermined regions.

6. The apparatus of claim 5 wherein:
   (a) each of said plurality of stages of the control means is a trigger circuit operable to switch on when an input thereto makes an excursion into a region below a first predetermined level and to switch off when the input thereto makes an excursion into a region above a second predetermined level, and
   (b) the operation of said sequencing network applies the control signal selectively as an input to said trigger circuits.

7. The apparatus of claim 5 wherein:
   (a) each of said switching means is a relay device having a plurality of contact members operated thereby, and
   (b) said sequencing network is comprised of interconnected combinations of contact members of said relay devices.

8. The apparatus of claim 3 wherein:
   (a) protective means is provided for sensing an open circuit condition at the machining gap and for producing an override signal having a fixed level between said first and second preset regions, and
   (b) coupling means are provided for connecting said override signal directly to said control means to prevent operation of the switching means during the time of an open circuit condition in the machining gap.

9. The apparatus of claim 8 wherein:
   (a) said protective means is responsive to the voltage across the machining gap produced by the output stage direct current pulses, and
   (b) said protective means includes means for delaying the response thereof for a predetermined time upon each output stage direct current pulse to distinguish between normal gap ionization and true open circuit conditions.

10. The apparatus of claim 9 wherein:
   (a) said protective means includes a transfer circuit operable to produce a direct current signal for each occurrence of an output stage direct current pulse during open circuit conditions,
   (b) said protective means includes an averaging circuit producing a direct current output having an amplitude corresponding to the average amplitude of the transfer circuit output signals, and (c) said protective means further includes a clamping circuit operable to output the override signal when the averaging circuit output exceeds a predetermined amplitude.

References Cited

UNITED STATES PATENTS

| | | | |
|---|---|---|---|
| 3,018,411 | 1/1962 | Webb | 315—163 |
| 3,178,551 | 4/1965 | Webb | 219—69 |
| 3,257,580 | 6/1966 | Webb | 315—127 |
| 3,267,327 | 8/1966 | Webb | 315—127 |
| 3,378,667 | 4/1968 | Webb | 219—69 |

JOHN W. HUCKERT, *Primary Examiner.*

R. SANDLER, *Assistant Examiner.*

U.S. Cl. X.R.

219—69; 315—269